United States Patent [19]

Inoue et al.

[11] Patent Number: 4,792,197
[45] Date of Patent: Dec. 20, 1988

[54] FABRICATION METHOD AND EQUIPMENT FOR DIFFRACTION GRATINGS

[75] Inventors: Hiroaki Inoue; Shinji Tsuji, both of Hachioji; Hiroyoshi Matsumura, Saitama; Akira Arimoto, Musashimurayama, all of Japan

[73] Assignee: Hitachi, Ltd., Tokyo, Japan

[21] Appl. No.: 886,818

[22] Filed: Jul. 18, 1986

[30] Foreign Application Priority Data

Jul. 19, 1985 [JP] Japan .................................. 60-158169

[51] Int. Cl.$^4$ .......................... G02B 5/32; G03H 1/04
[52] U.S. Cl. .................................... 350/3.7; 350/3.83; 350/162.2; 350/163
[58] Field of Search ....................... 350/3.7, 3.83, 363, 350/163, 162.2

[56] References Cited

U.S. PATENT DOCUMENTS

| | | | |
|---|---|---|---|
| 3,650,605 | 3/1972 | Little, Jr. | 350/163 |
| 3,708,217 | 1/1973 | McMahon | 350/3.7 |
| 4,412,719 | 11/1983 | Fienup | 350/3.7 |

Primary Examiner—Bruce Y. Arnold
Attorney, Agent, or Firm—Antonelli, Terry & Wands

[57] ABSTRACT

A method and equipment for fabricating two diffraction gratings having the same period but phases that are shifted by λ/4 on a work to be treated. A laser beam is divided into two light beams and one of the beams is delayed over a portion of the light beam. The divided light beams are then mixed together so that they interfere. Using the known photolithography technology, the interference patterns are formed into diffraction gratings.

14 Claims, 3 Drawing Sheets

$f_1 = f_2$ $f_1 > f_2$

FABRICATION METHOD AND EQUIPMENT FOR DIFFRACTION GRATINGS

BACKGROUND OF THE INVENTION

The present invention relates to a method and equipment for fabricating diffraction gratings, and more particularly to a method and equipment for fabricating diffraction gratings by two-beam interference, that is adapted to produce a DFB (distributed feedback) laser which consists of a homogeneous diffraction grating for the light source of optical fiber communications.

The conventional DFB laser shown in FIG. 1 operates at two different wavelengths at the same time, because the threshold currents for each wavelength λ (or propagation constant β) will degenerate with each other, as has been disclosed in H. Kogelnik et al., J. Appl. Phys., Vol. 43, pp. 2327–2335, 1972. To make a single longitudinal mode, therefore, it is an essential requirement to adjust the relative positions between the cleavage plane and the diffraction grating as has been experimentally demonstrated in T. Matsuoka et al., Jpn. Appl. Phys., Vol. 23, pp. L138–L140, 1984. To realize the single longitudinal mode, the positional precision of about ±100 angstroms is necessary, and it is difficult to adjust the relative positions relying upon the position of ordinarily employed cleavage. According to Haus et al., IEEE J. Quantum Electronics, Vol. QE-12, pp. 532–539, 1976, on the other hand, it has been reported that the operation at the single longitudinal mode can be stably obtained if the diffraction grating is shifted in phase by λ/4 at nearly the center of the element. The diffraction grating having such a phase shift can be fabricated by a method of direct drawing based upon the electron beam disclosed in K. Sekartedjo et al., Electron Letter, 1983, or by a method which employs both a positive resist and a negative resist. With the method of direct drawing based upon the electron beam, however, the throughput is substantially small. With the method which employs a positive and negative resists, on a other hand, thickness of the resists becomes uneven, and the obtained diffraction gratings exhibit asymmetrical diffraction efficiency depending upon the right and left halves of the element, making it difficult to reproduce the single-mode operation.

An interference method can also be used as shown in FIG. 3. In this case, the laser beam emitted from a laser beam source 11 such as He-Cd laser or argon laser is split through a beam splitter 12, the beams after being split, are expanded for their diameter through beam expanders 131, 132, reflected by mirrors 141, 142 to change their directions of propagation, and are projected onto the surface of a specimen 15 to obtain fringed interference pattern. According to this conventional method without having a mechanism for adjusting the phase for the two light beams however, it is not possible to deliberately obtain diffraction gratings having dissimilar phases while maintaining the same period.

SUMMARY OF THE INVENTION

The object of the present invention is to provide a method and equipment for fabricating diffraction gratings, which eliminate the aforementioned problems inherent in the conventional art, make it possible to form diffraction gratings having the same period but different phases on the same substrate while maintaining good reproducibility and to produce a single longitudinal mode laser maintaining good reproducibility.

In order to achieve the above-mentioned object, the present invention deals with a method and equipment for fabricating diffraction grating patterns on the surface of a material, for example, on the surface of a semiconductor substrate of which the properties change depending upon the photochemical reaction whose rate or properties change depending upon the distribution of intensity of light of the interference pattern, by dividing a laser beam into at least two light beams to produce a difference in the length of optical paths, and mixing the light beams to form the interference pattern, wherein the fabrication method enables the phase of light to be adjusted by a required amount in at least one of the two divided light beams, such that the position of the interference pattern can be changed by a required amount, and wherein the fabrication apparatus is equipped with an optical path length adjustable two-beam interferometer which enables the phase of light to be adjusted by a required amount in at least one of the two divided light beams, such that the position of the interference pattern can be changed by a required amount.

If coherent two beams having a wavelength λ fall on the surface of a specimen, if the angle defined by the two beams is denoted by 2θ, and if the angle defined by a middle line in the above angle and a normal drawn to the surface of the specimen is denoted by δ, there appears a fringe pattern on the surface of the specimen having a period Λ given by, $$\Lambda = \frac{\lambda}{2 \cdot \sin\theta \cdot \cos\delta}$$

The bright and dark fringes in the interference pattern correspond to a phase difference between the two light beams which is equal to $2N\pi$, $(2N+1)\pi$ where N is a given integer. By delaying the phase of at least one light beam, therefore, it becomes possible to shift the positions of bright and dark fringes. The diffraction gratings can be fabricated on the surface of the specimen by utilizing a photochemical reaction based upon the interference light. It is, however, possible to form a suitable phase difference in the diffraction gratings by disposing a material at a position 2,, 22 or 23 in FIG. 4, the material producing a suitable difference in the optical path in at least a portion of the plane perpendicular to the optical axis of the light beam.

When the distance is great between the surface of the specimen 15 and the position of the material 24 that produces a difference in the optical path, and when the material 24 has a small region to change the length of the optical path, the pattern of diffraction gratings may be degraded on the surface of the specimen 15 due to the effect of diffraction depending upon the ratio of the distance between (1) the surface of the specimen 15 and the position of the material 24 and (2) the size of the region of material 24 which changes the length of the optical path To remove the effect of diffraction, imaging optics such s lens 16 should be inserted between the material 24 and the surface of the specimen 15, so that the optical real image of the material is localized near the surface of the specimen 15.

In the interference exposure method as described above, one light beam is partly delayed, and thus the phase is changed in the interference fringes in order to form diffraction gratings having the same period but having a phase shift on the same substrate.

Further, a material that changes the phase need not be brought into contact with the substrate, and the process can be simplified. It is further possible to form diffraction gratings having a phase shift even on the surface of a rough specimen. Accordingly, a single-mode laser can be obtained maintaining good reproducibility.

DETAILED DESCRIPTION OF THE PRESENTLY PREFERRED EMBODIMENTS:

Embodiment 1

Figure 4:
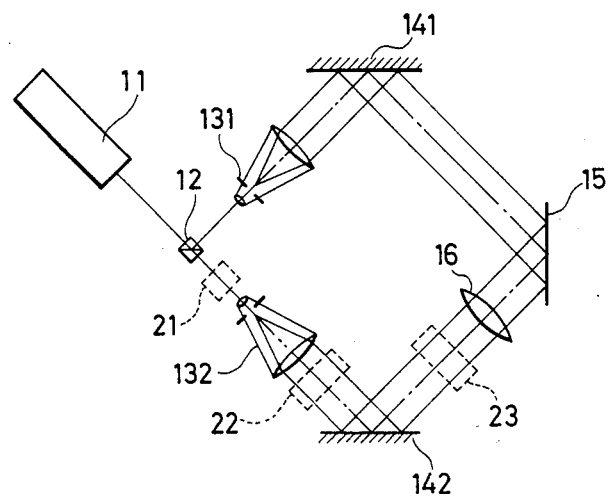
FIG. 4 is a schematic diagram of an interference exposure apparatus of the phase delay type according to the present invention.
Figure 5:
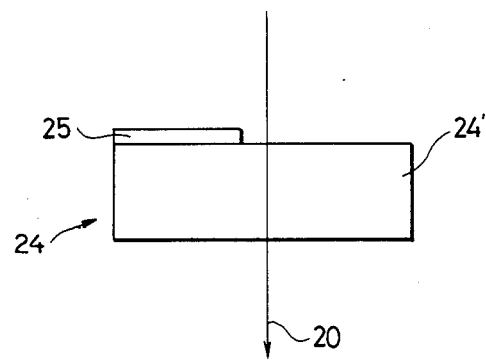
FIG. 5 is a diagram showing a delay system according to the present invention.

With reference to FIG. 4, if a mechanism for causing a phase change is provided at any one of the positions 21 22 and 23, or on a mirror 142, there can be obtained on the same substrate diffraction gratings having an equal grating distance but different phases. An example of the mechanism disposed at the position 21, 22 or 23 to cause a phase change is shown in detail in FIG. 5. The material 24 which causes a phase change is shown to include plate 24, and material 25 which covers only portions of plate 24'. That is, the phase can be shifted by disposing a material which has an index of refraction different from that of the surrounding air and which produces a suitable difference in the optical path at least in a portion of the surface perpendicular to the optical axis of at least one light beam.

Described below is the case where a phase difference of λ/2 is produced in a portion of the light beam by installing at the position 23 of FIG. 4 an optical flat (1 cm thick) made of quartz which has an $SiO_2$ coating of 1100 Å when a He-Cd laser beam (λ=3250 Å) is used or of 1700 Å when an Ar laser beam (λ=5145 Å) is used, placed on a portion on one surface thereof, both surfaces of the flat being coated with an anti-reflection coat.

Figure 1:
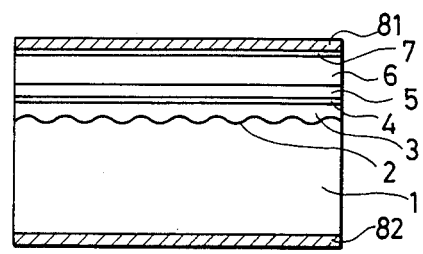
FIG. 1 is a section view showing a conventional DFB laser.
Figure 2:
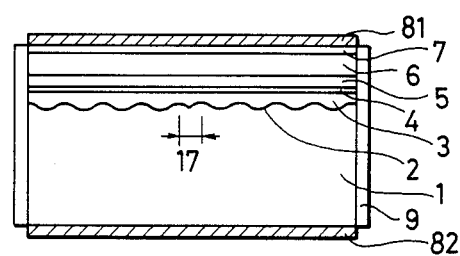
FIG. 2 is a section view showing a DFB laser of the phase shift type.
Figure 3:
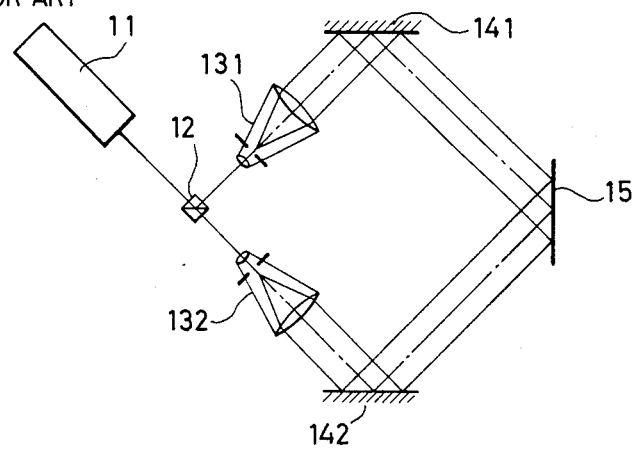
FIG. 3 is a schematic diagram of a conventional interference exposure apparatus for producing the phase shift-type DFB laser.

An InP substrate coated with an AZ-type resist is used as the specimen 15, and developing is effected using an AZ developer, to obtain a grating having different phases as a resist pattern. With the resist as a mask, the grating is transferred onto the InP substrate by using an etching solution composed of $HBr:HNO_3:H_2O$ (=1:1:30). On an n-type InP substrate 1 on which is transferred the grating 2 with phase difference (FIG. 2) are formed, by the liquid-phase epitaxial method, an InGaAsP optical guide layer 3 (doped with tellurium, having a carrier concentration of $1 \times 10^{18}$ cm$^{-3}$, a thickness of about 0.1 μm, and a calculated band gap wavelength of 1.3 μm), an InGaAsP active layer 4 (undoped, having a thickness of about 0.1 μm, and a calculated band gap wavelength of 1.5 μm), an InGaAsP buffer layer 5 (doped with zinc, having a carrier concentration of $7 \times 10^{17}$ cm$^{-3}$, a thickness of about 0.1 μm, and a calculated band gap wavelength of 1.3 μm), a p-type InP layer 6 (doped with zinc, having a carrier concentration of $7 \times 10^{17}$ cm$^{-13}$, and a thickness of 3 μm), and a p-type InGaAsP cap layer 7 (doped with zinc, having a carrier concentration of $5 \times 10^{18}$ cm$^{-3}$, a thickness of 0.4 μm, and a calculated band gap wavelength of 1.5 μm), and a p-type electrode 81 (Au/Cr) and an n-type electrode 82 (Au/Sn) which are deposited by vaporization, followed by cleavage. Then, an anti-reflection coat 9 (SiN) is formed on the cleavage planes to prepare a semiconductor laser element shown in FIG. 2. This element operates at Bragg wavelength on a single longitudinal mode, and exhibits the effect of shifting the phase.

As described in the summary of the invention, if the distance is great between the specimen 15 and the material 24 which shifts the phase, the phase shift pattern is degraded on the surface of the specimen 15 due to the diffraction phenomenon of light waves, and it becomes difficult to effectively form the gratings 2 having phase difference. Furthermore, it is necessary to shift the phase when it is attempted to form a plurality of DFB lasers simultaneously on the specimen 15. To effectively fabricate the DFB laser on the specimen 15, a minimum size of phase shift pattern is about 400 μm and the light wave is diffracted. It is effective to use imaging optics in order to prevent the pattern of the gratings 2 having phase difference from being degrade by the diffraction of light waves. In order to confirm this effect according to this embodiment, a material 24 that causes phase difference to develop was disposed at the position 22. The semiconductor laser, however, did not operate, and the effect of shifting the phase could not be confirmed. In the arrangement of this embodiment, therefore, a lens 16 was inserted between the mirror 142 and the specimen 15 to localize the real image of the material 24 near the specimen 15, thereby preparing a semiconductor laser element with the gratings 2 having a phase difference. This element operated in the single longitudinal mode, and the effect of the imaging optics could be confirmed.

Embodiment 2

Figure 6A:
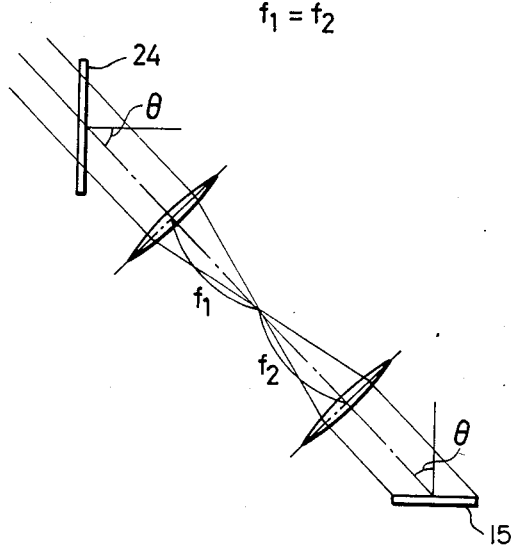
FIGS. 6a and 6b are diagrams illustrating the optical coupling systems.

An embodiment to improve the optical coupling system will be described with reference to FIGS. 6a and 6b. Here, the coupling system consists of two lenses having an equal focal distance ($f_1 = f_2$) that are arranged confocally. Observation of diffraction gratings fabricated on the resist made it obvious that the data of spatial phase difference produced by the material 24 is correctly transferred onto the surface of the specimen 15. Pattern degradation, i.e., transition region caused by diffraction, develops between the two regions where the phase difference takes place. According to the method of the first embodiment, this region was about 10 μm. According to the method of the second embodiment, however, the region is reduced to as small as about 1 μm. That is, the phase difference with a small transition region is effective for fabricating the gratings.

Figure 6B:
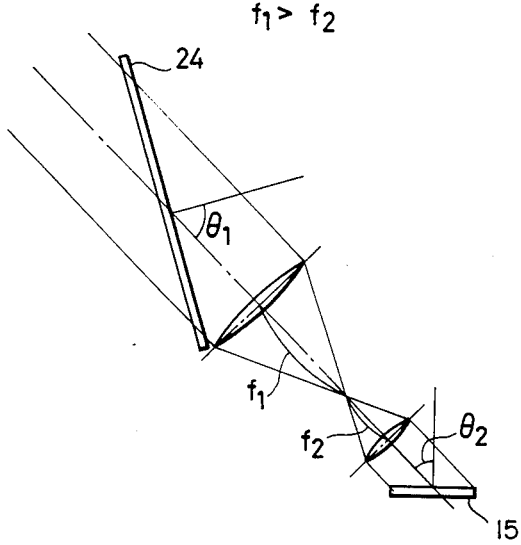

It is also possible to arrange two lenses having dissimilar focal distances in the confocal optics as shown in FIG. 6b optics. In this case, the angle $\theta_1$ defined by the material 24 which causes a phase change and the optical axis may not be equal to the angle $\theta_2$ defined by the surface of the specimen 15 and the optical axis. However, an advantage is obtained in that the sizes of patterns can be varied on the material which causes a phase change and on the surface of the specimen. That is, a fine phase adjustable pattern on the surface of the specimen can be formed from a large phase adjustable pattern of the material which causes a phase change. When a ratio of focal distances is 4 to 1, furthermore, the transition region can be further decreased to smaller than 0.5 μm.

What is claimed is:

1. In a method of fabricating a diffraction grating on materials by dividing a laser beam into at least two light beams, mixing them together so that said at least two light beams interfere to form an interference pattern, and by utilizing a photochemical reaction of which the rate changes or properties change depending upon the distribution of intensity of light in the interference pattern, the improvement wherein at least one of said at least two light beams is delayed over a portion of the light beam by a given amount causing pattern fringes to shift over at least a portion of the pattern.

2. A method of fabricating a diffraction grating according to claim 1, wherein said at least one of said at least two light beams is delayed over a portion of the light beam by effectively changing the length of the optical path of the light beam by inserting in a portion of at least one optical path a material that has an index of refraction different from that of the surrounding atmosphere.

3. A method of fabricating a diffraction grating according to claim 2, wherein optic means to remove the effect of diffraction from the surface of a material on which diffraction gratings are to be formed are provided, said effect of diffraction being generated by at least a portion of said material that has an index of refraction different from that of the surrounding atmosphere.

4. A method of forming a diffraction grating according to claim 3, wherein said optic means to remove the effect of diffraction from the surface of a material on which diffraction gratings are to be formed comprises a confocal lens system.

5. A method of fabricating a diffraction grating according to claim 2, wherein said material on which the diffraction grating is fabricated is not in contact with said material that has an index of refraction different from that of the surrounding atmosphere.

6. Equipment for fabricating a diffraction grating on materials, comprising:
    a means for emitting a laser beam;
    a means for dividing said laser beam into at least two light beams;
    a means for mixing said at least two light beams together so that said at least two light beams interfere at said materials to form an interference pattern; and
    a means for delaying at least one of said at least two light beams over a portion of the light beam by a given amount, causing pattern fringes to shift over at least a portion of the pattern.

7. Equipment for fabricating a diffraction grating according to claim 6, wherein said means for delaying at least one of said at least two light beams includes a material that has a index of refraction different from that of the surrounding atmosphere in a portion of at least one optical path and which delays said at least one of said at least two light beams over a portion of the light beams by effectively changing the length of the optical path of the light beam.

8. Equipment for fabricating a diffraction grating according to claim 7, further comprising optic means to remove the effect of diffraction from the surface of said materials on which diffraction gratings are to be formed, said effect of diffraction being generated by at least a portion of said material that has an index of refraction different from the surrounding atmosphere.

9. Equipment for fabricating a diffraction grating according to claim 8, wherein said optic means to remove the effect of diffraction from the surface of said materials on which diffraction gratings are to be formed comprises a confocal lens system.

10. A method of fabricating a diffraction grating on materials, comprising the steps of:
    dividing a laser beam into at least two light beams;
    delaying at least one of said at least two light beams over a portion of the light beam by a given amount;
    mixing said at least two light beams together so that they interfere to form an interference pattern; and
    forming a diffraction grating on said materials utilizing a photochemical reaction, the rate of which changes depending upon the distribution of intensity of light in said interference pattern, wherein the step of delaying at least one of said at least two light beams over a portion of the light beam by a given amount causes pattern fringes to shift over at least a portion of the pattern.

11. A method of fabricating a diffraction grating according to claim 10, wherein said at least one of said at least two light beams is delayed over a portion of the light beam by effectively changing the length of the optical path of the light beam by inserting in a portion of at least one optical path a material that has an index of refraction different from that of the surrounding atmosphere.

12. A method of fabricating a diffraction grating according to claim 11, wherein optic means to remove the effect of diffraction from the surface of a material on which diffraction gratings are to be formed are provided, said effect of diffraction being generated by at least a portion of said material that has an index of refraction different from that of the surrounding atmosphere.

13. A method of fabricating a diffraction grating according to claim 12, wherein said optic means to remove the effect of diffraction from the surface of a material on which diffraction gratings are to be formed comprising a confocal lens system.

14. A method of fabricating a diffraction grating according to claim 11, wherein said material on which the diffraction grating is fabricated is not in contact with said material that has an index of refraction different from that of the surrounding atmosphere.

* * * * *